United States Patent
Horn et al.

(10) Patent No.: US 12,490,252 B2
(45) Date of Patent: Dec. 2, 2025

(54) USER EQUIPMENT REPORTING FOR FULL DUPLEX MULTI-BEAM SELECTION

(71) Applicant: QUALCOMM Incorporated, San Diego, CA (US)

(72) Inventors: Idan Michael Horn, Hod Hasharon (IL); Ran Berliner, Kfar Aviv (IL); Assaf Touboul, Netanya (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 18/304,619

(22) Filed: Apr. 21, 2023

(65) Prior Publication Data
US 2023/0388993 A1    Nov. 30, 2023

Related U.S. Application Data

(63) Continuation of application No. 17/107,703, filed on Nov. 30, 2020, now Pat. No. 11,665,683.

(51) Int. Cl.
*H04B 7/00*    (2006.01)
*H04B 7/06*    (2006.01)
*H04L 5/14*    (2006.01)
*H04W 24/10*    (2009.01)
*H04W 72/044*    (2023.01)
*H04W 72/541*    (2023.01)

(52) U.S. Cl.
CPC ........ *H04W 72/046* (2013.01); *H04B 7/0696* (2023.05); *H04L 5/14* (2013.01); *H04W 24/10* (2013.01); *H04W 72/541* (2023.01)

(58) Field of Classification Search
CPC . H04W 72/046; H04W 24/10; H04W 72/541; H04W 24/08; H04W 48/16; H04B 7/0696; H04B 7/0621; H04B 17/345; H04B 7/088; H04L 5/14; H04L 5/0048
See application file for complete search history.

(56) References Cited

U.S. PATENT DOCUMENTS

| 11,658,729 | B2* | 5/2023 | Zhang | H04B 7/0696 370/329 |
| 2017/0238294 | A1 | 8/2017 | Lim et al. | |
| 2018/0083679 | A1* | 3/2018 | Lim | H04B 7/0695 |

(Continued)

FOREIGN PATENT DOCUMENTS

WO    WO-2021226619 A1 *    11/2021    ........... H04B 7/0696

OTHER PUBLICATIONS

International Search Report and Written Opinion—PCT/US2021/057568—ISA/EPO—Mar. 7, 2022.

*Primary Examiner* — Thai Dinh Hoang
(74) *Attorney, Agent, or Firm* — QUALCOMM Incorporated

(57) ABSTRACT

Various aspects of the present disclosure generally relate to wireless communication. In some aspects, a user equipment (UE) may determine a set of recommended base station transmit beams for full duplex operation based at least in part on measurements of a set of base station transmit beams and measurements of self-interference associated with the set of base station transmit beams. The UE may transmit a report that indicates a recommendation to use one or more of the set of recommended base station transmit beams for full duplex operation. Numerous other aspects are described.

30 Claims, 11 Drawing Sheets

(56) References Cited

U.S. PATENT DOCUMENTS

2018/0205533 A1    7/2018   Lee et al.
2020/0358500 A1   11/2020   Ryu et al.
2022/0174654 A1    6/2022   Horn et al.

* cited by examiner

USER EQUIPMENT REPORTING FOR FULL DUPLEX MULTI-BEAM SELECTION

CROSS-REFERENCE TO RELATED APPLICATION

The present application for patent is a continuation of U.S. patent application Ser. No. 17/107,703, filed Nov. 30, 2020, and assigned to the assignee hereof. The disclosure of the prior Application is considered part of and is incorporated by reference in this patent application.

FIELD OF THE DISCLOSURE

Aspects of the present disclosure generally relate to wireless communication and to techniques and apparatuses for user equipment reporting for full duplex multi-beam selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining a set of recommended base station transmit beams for full duplex operation based at least in part on measurements of a set of base station transmit beams and measurements of self-interference associated with the set of base station transmit beams; and transmitting a report that indicates a recommendation to use one or more of the set of recommended base station transmit beams for full duplex operation.

In some aspects, a method of wireless communication performed by a base station includes receiving, from a UE, a report that indicates a recommendation to use one or more of a set of recommended base station transmit beams for full duplex operation, the recommendation based at least in part on measurements of a set of base station transmit beams and measurements of self-interference associated with the set of base station transmit beams; and transmitting an indication of one or more base station transmit beams and one or more base station receive beams configured for a subsequent communication based at least in part on the recommendation.

In some aspects, a UE for wireless communication includes a memory; and one or more processors operatively coupled to the memory, the memory and the one or more processors configured to: determine a set of recommended base station transmit beams for full duplex operation based at least in part on measurements of a set of base station transmit beams and measurements of self-interference associated with the set of base station transmit beams; and transmit a report that indicates a recommendation to use one or more of the set of recommended base station transmit beams for full duplex operation.

In some aspects, a base station for wireless communication includes a memory; and one or more processors operatively coupled to the memory, the memory and the one or more processors configured to: receive, from a UE, a report that indicates a recommendation to use one or more of a set of recommended base station transmit beams for full duplex operation, the recommendation based at least in part on measurements of a set of base station transmit beams and measurements of self-interference associated with the set of base station transmit beams; transmit an indication of one or more base station transmit beams and one or more base station receive beams configured for a subsequent communication based at least in part on the recommendation.

In some aspects, a non-transitory computer-readable medium storing a set of instructions for wireless communication includes one or more instructions that, when executed by one or more processors of a UE, cause the UE to: determine a set of recommended base station transmit beams for full duplex operation based at least in part on measurements of a set of base station transmit beams and measurements of self-interference associated with the set of base station transmit beams; and transmit a report that indicates a recommendation to use one or more of the set of recommended base station transmit beams for full duplex operation.

In some aspects, a non-transitory computer-readable medium storing a set of instructions for wireless communication includes one or more instructions that, when executed by one or more processors of a base station, cause the base station to: receive, from a UE, a report that indicates a recommendation to use one or more of a set of recommended base station transmit beams for full duplex operation, the recommendation based at least in part on measurements of a set of base station transmit beams and measurements of self-interference associated with the set of base station transmit beams; and transmit an indication of one or more base station transmit beams and one or more base station receive beams configured for a subsequent communication based at least in part on the recommendation.

In some aspects, an apparatus for wireless communication includes means for determining a set of recommended base station transmit beams for full duplex operation based at least in part on measurements of a set of base station transmit beams and measurements of self-interference associated with the set of base station transmit beams; and means for transmitting a report that indicates a recommendation to use one or more of the set of recommended base station transmit beams for full duplex operation.

In some aspects, an apparatus for wireless communication includes means for receiving, from a UE, a report that indicates a recommendation to use one or more of a set of recommended base station transmit beams for full duplex operation, the recommendation based at least in part on measurements of a set of base station transmit beams and measurements of self-interference associated with the set of base station transmit beams; and means for transmitting an indication of one or more base station transmit beams and one or more base station receive beams configured for a subsequent communication based at least in part on the recommendation.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
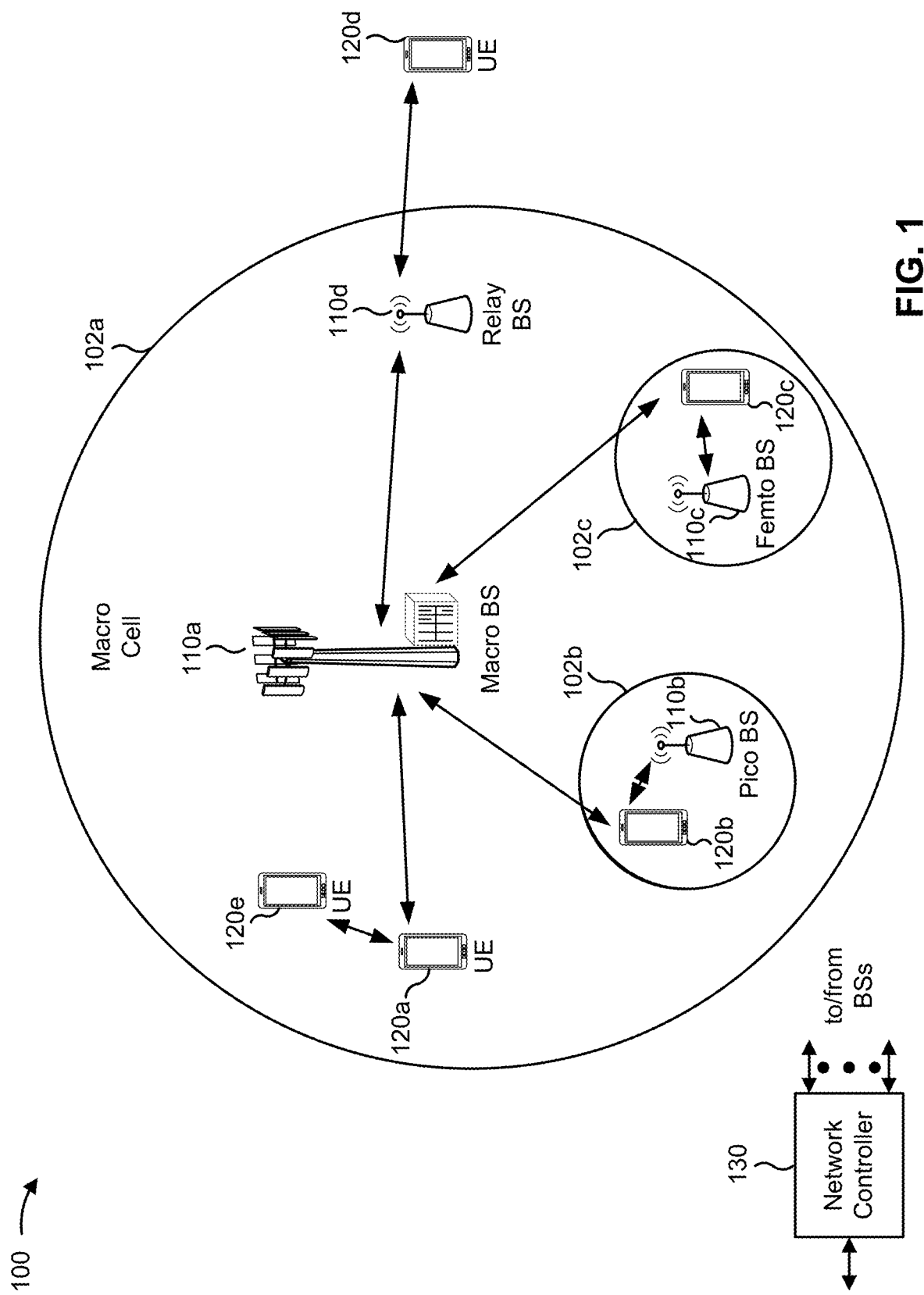
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
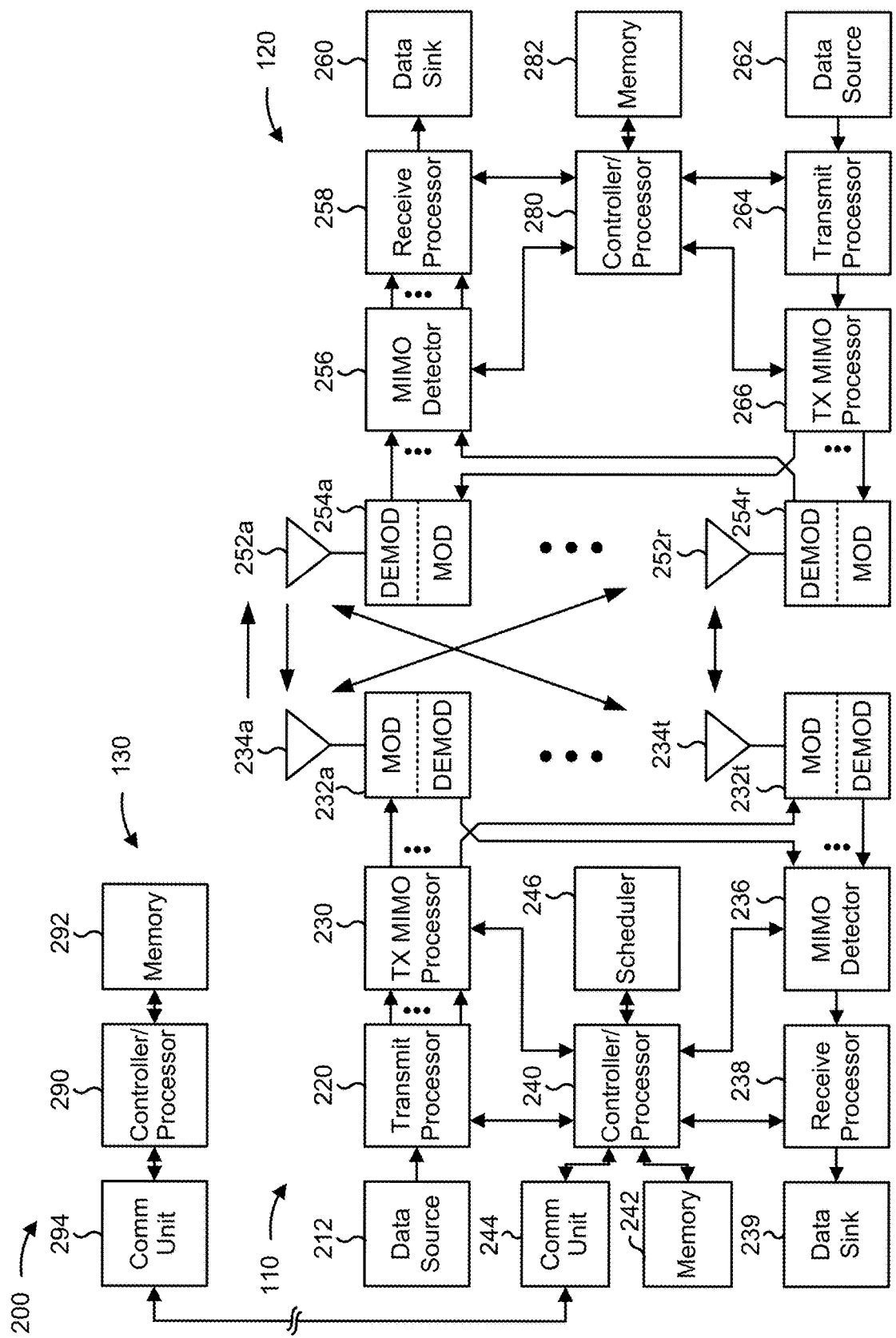
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-5C.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-5C.

Controller/processor 240 of base station 110, controller/processor 280 of UE 120, and/or any other component(s) of FIG. 2 may perform one or more techniques associated with user equipment reporting for full duplex multi-beam selection, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, the UE includes means for determining a set of recommended base station transmit beams for full duplex operation based at least in part on measurements of a set of base station transmit beams and measurements of self-interference associated with the set of base station transmit beams; or means for transmitting a report that indicates a recommendation to use one or more of the set of recommended base station transmit beams for full duplex operation. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving an allocation of resources for self-interference measurement; or means for measuring self-interference for multiple UE receive beams and multiple UE transmit beams based at least in part on simultaneously transmitting and receiving reference signals using the resources.

In some aspects, the UE includes means for receiving the allocation of resources via one or more of radio resource control signaling or medium access control signaling.

In some aspects, the UE includes means for generating, based at least in part on measuring self-interference for multiple UE receive beams and multiple UE transmit beams, a set of beam measurement parameters associated with pairings of UE transmit beams and UE receive beams.

In some aspects, the UE includes means for measuring reference signals transmitted via multiple base station transmit beams, of the set of base station transmit beams, simultaneously using multiple UE receive beams.

In some aspects, the UE includes means for generating, based at least in part on measuring the reference signals transmitted via multiple base station transmit beams using multiple UE receive beams, a set of beam measurement parameters associated with pairings of base station transmit beams and UE receive beams.

In some aspects, the UE includes means for determining the set of recommended base station transmit beams based at least in part on: a set of beam measurement parameters associated with pairings of UE transmit beams and UE receive beams, and a set of beam measurement parameters associated with pairings of base station transmit beams and UE receive beams.

In some aspects, the UE includes means for receiving an indication of one or more base station transmit beams and one or more base station receive beams configured for a subsequent communication.

In some aspects, the base station includes means for receiving, from a UE, a report that indicates a recommendation to use one or more of a set of recommended base station transmit beams for full duplex operation, the recommendation based at least in part on measurements of a set of base station transmit beams and measurements of self-interference associated with the set of base station transmit beams; or means for transmitting an indication of one or more base station transmit beams and one or more base station receive beams configured for a subsequent communication based at least in part on the recommendation. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for transmitting an allocation of resources for self-interference measurement by a UE using a set of UE receive beams associated with the set of base station transmit beams.

In some aspects, the base station includes means for transmitting configuration information that indicates that the UE is to: generate, based at least in part on measuring self-interference for multiple UE receive beams and multiple UE transmit beams using the resources, a set of beam measurement parameters associated with pairings of UE transmit beams and UE receive beams.

In some aspects, the base station includes means for transmitting the allocation of resources via one or more of radio resource control signaling or medium access control signaling.

In some aspects, the base station includes means for transmitting reference signals via the set of base station transmit beams for measurement by the UE using multiple UE receive beams.

In some aspects, the base station includes means for transmitting configuration information that indicates that the UE is to: generate, based at least in part on measuring the reference signal transmitted using multiple UE receive beams, a set of beam measurement parameters associated with pairings of base station transmit beams and UE receive beams.

In some aspects, the base station includes means for transmitting configuration information that indicates that the UE is to: determine the set of recommended base station transmit beams based at least in part on: a set of beam measurement parameters associated with pairings of UE transmit beams and UE receive beams, and a set of beam measurement parameters associated with pairings of base station transmit beams and UE receive beams.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
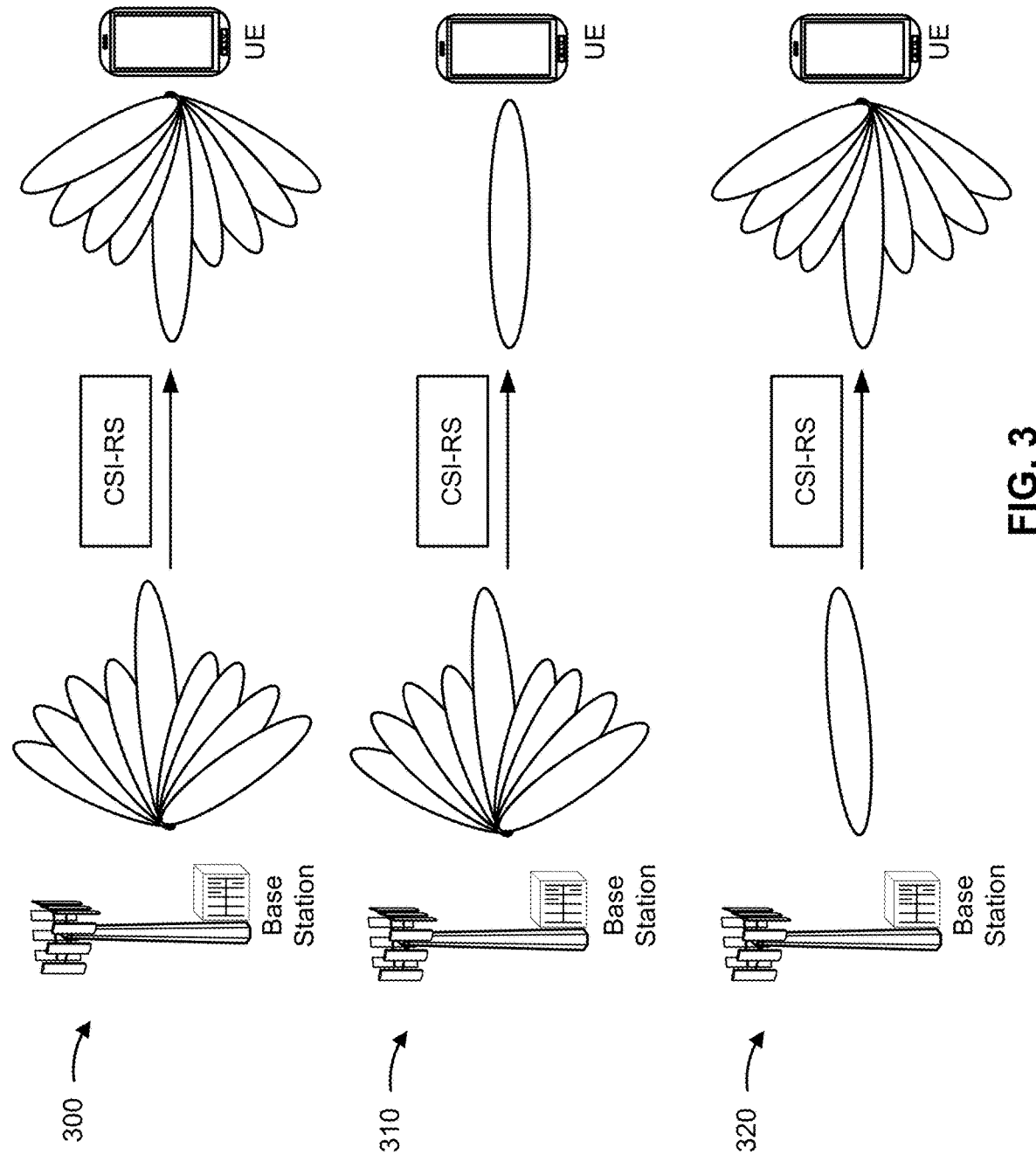
FIG. 3 is a diagram illustrating examples of beam management procedures, in accordance with various aspects of the present disclosure

FIG. 3 is a diagram illustrating examples 300, 310, and 320 of beam management procedures, in accordance with various aspects of the present disclosure. As shown in FIG. 3, examples 300, 310, and 320 include a UE in communication with a base station in a wireless network (e.g., wireless network 100). However, the devices shown in FIG. 3 are provided as examples, and the wireless network may support communication and beam management between other devices (e.g., between a UE and a base station or TRP, between a mobile termination node and a control node, between an integrated access and backhaul (IAB) child node and an IAB parent node, between a scheduled node and a scheduling node, and/or the like). In some aspects, the UE and the base station may be in a connected state (e.g., a radio resource control (RRC) connected state and/or the like).

As shown in FIG. 3, example 300 may include a base station and a UE communicating to perform beam management using reference signals (e.g., channel state information reference signals (CSI-RSs)). Example 300 depicts a first beam management procedure (e.g., P1 beam management). The first beam management procedure may be referred to as a beam selection procedure, an initial beam acquisition procedure, a beam sweeping procedure, a cell search procedure, a beam search procedure, and/or the like. As shown in FIG. 3 and example 300, CSI-RSs may be configured to be transmitted from the base station to the UE. The CSI-RSs may be configured to be periodic (e.g., using RRC signaling and/or the like), semi-persistent (e.g., using media access control (MAC) control element (MAC-CE) signaling and/or the like), and/or aperiodic (e.g., using downlink control information (DCI) and/or the like).

The first beam management procedure may include the base station performing beam sweeping over multiple transmit (Tx) beams. The base station may transmit a CSI-RS using each transmit beam for beam management. To enable the UE to perform receive (Rx) beam sweeping, the base station may use a transmit beam to transmit (e.g., with repetitions) each CSI-RS at multiple times within the same reference signal (RS) resource set so that the UE can sweep through receive beams in multiple transmission instances. For example, if the base station has a set of N transmit beams and the UE has a set of M receive beams, the CSI-RS may be transmitted on each of the N transmit beams M times so that the UE may receive M instances of the CSI-RS per transmit beam. In other words, for each transmit beam of the base station, the UE may perform beam sweeping through the receive beams of the UE. As a result, the first beam management procedure may enable the UE to measure a CSI-RS on different transmit beams using different receive beams to support selection of base station transmit beams/UE receive beam(s) beam pair(s). The UE may report the measurements to the base station to enable the base station to select one or more beam pair(s) for communication between the base station and the UE. While example 300 has been described in connection with CSI-RSs, the first beam management process may also use synchronization signal blocks (SSBs) for beam management in a similar manner as described above.

As shown in FIG. 3, example 310 may include a base station and a UE communicating to perform beam management using CSI-RSs. Example 310 depicts a second beam management procedure (e.g., P2 beam management). The second beam management procedure may be referred to as a beam refinement procedure, a base station beam refinement procedure, a TRP beam refinement procedure, a transmit beam refinement procedure, and/or the like. As shown in FIG. 3 and example 310, CSI-RSs may be configured to be transmitted from the base station to the UE. The CSI-RSs may be configured to be aperiodic (e.g., using DCI and/or the like). The second beam management procedure may include the base station performing beam sweeping over one or more transmit beams. The one or more transmit beams may be a subset of all transmit beams associated with the base station (e.g., determined based at least in part on measurements reported by the UE in connection with the first beam management procedure). The base station may transmit a CSI-RS using each transmit beam of the one or more transmit beams for beam management. The UE may measure each CSI-RS using a single (e.g., a same) receive beam (e.g., determined based at least in part on measurements performed in connection with the first beam management procedure). The second beam management procedure may enable the base station to select a best transmit beam based at least in part on measurements of the CSI-RSs (e.g., measured by the UE using the single receive beam) reported by the UE.

As shown in FIG. 3, example 320 depicts a third beam management procedure (e.g., P3 beam management). The third beam management procedure may be referred to as a beam refinement procedure, a UE beam refinement procedure, a receive beam refinement procedure, and/or the like. As shown in FIG. 3 and example 320, one or more CSI-RSs may be configured to be transmitted from the base station to the UE. The CSI-RSs may be configured to be aperiodic (e.g., using DCI and/or the like). The third beam management process may include the base station transmitting the one or more CSI-RSs using a single transmit beam (e.g., determined based at least in part on measurements reported by the UE in connection with the first beam management procedure and/or the second beam management procedure). To enable the UE to perform receive beam sweeping, the base station may use a transmit beam to transmit (e.g., with repetitions) CSI-RS at multiple times within the same RS resource set so that UE can sweep through one or more receive beams in multiple transmission instances. The one or more receive beams may be a subset of all receive beams associated with the UE (e.g., determined based at least in part on measurements performed in connection with the first beam management procedure and/or the second beam management procedure). The third beam management procedure may enable the base station and/or the UE to select a best receive beam based at least in part on reported measurements received from the UE (e.g., of the CSI-RS of the transmit beam using the one or more receive beams).

As indicated above, FIG. 3 is provided as an example of beam management procedures. Other examples of beam management procedures may differ from what is described with respect to FIG. 3. For example, the UE and the base station may perform the third beam management procedure before performing the second beam management procedure, the UE and the base station may perform a similar beam management procedure to select a UE transmit beam, and/or the like.

As part of a beam management procedure (e.g., P2 beam management), a UE may measure reference signals transmitted using various base station transmit beams. The UE may transmit a report, based at least in part on measurements of the reference signals, to indicate one or more preferred base station transmit beams for subsequent transmissions by the base station. Additionally, the UE may measure one or more reference signals, transmitted by the base station using a base station transmit beam, using multiple UE receive beams (e.g., P3 beam management). Based at least in part on measurements of the one or more reference signals, the UE may determine a UE receive beam to pair with the base station transmit beam (e.g., to use for receiving transmissions from the base station that are transmitted using the base station transmit beam).

Based at least in part on the base station and the UE being configured to communicate in a full duplex mode, the UE may indicate a first preferred base station transmit beam and a second preferred base station transmit beam based at least in part on measurements of reference signals. Additionally, or alternatively, the UE may determine a first UE receive beam to pair with the first preferred base station transmit beam and a second UE receive beam to pair with the second preferred base station transmit beam based at least in part on measurements of one or more reference signals.

However, the UE may determine to indicate the first preferred base station transmit beam and/or the second preferred base station transmit beam based at least in part on independent measurements of reference signals transmitted via the first preferred base station transmit beam and/or the second preferred base station transmit beam. In some aspects, the base station may use the first preferred base station transmit beam to transmit signals and may use a receive beam that is reciprocal to the second preferred base station transmit beam to receive signals in full duplex operation.

A determination based at least in part on independent measurements of reference signals may result in indicating a first preferred base station transmit beam that may have interference (e.g., self-interference) with communications using the second preferred base station transmit beam. This may cause interference and/or a reduced signal-to-interference-plus-noise ratio (SINK), which may result in an increased error rate and/or a reduced spectral efficiency (e.g., based at least in part on using a relatively low MCS), among other examples.

In some aspects described herein, a UE may measure a set of base station transmit beams and/or generate a set of beam measurement parameters associated with pairings of base station transmit beams and UE receive beams. The UE may also measure self-interference for multiple UE receive beams and multiple UE transmit beams based at least in part on simultaneously transmitting and receiving reference signals using resources allocated by a base station. The UE may determine recommended base station transmit beams (e.g., optimized for full duplex multi-beam communication) based at least in part on measurements of self-interference beam relations (e.g., self-interference between UE receive beams and UE transmit beams) and based at least in part on base station transmit beam to UE receive beam inter-beam interference (e.g., joint quasi-co-location (QCL). The UE may transmit a report that indicates a recommendation to use one or more of the recommended base station transmit beams to use for full duplex operation, based at least in part on inter-spatial separation and intra-spatial separation of the recommended base station transmit beams.

In this way, the UE may recommend beams for full duplex operation that have relatively good beam measurement parameters (e.g., with high RSRP) associated with pairings of base station transmit beams and UE receive beams, and that have relatively good beam measurement parameters (e.g., with relatively low measured interference and/or relatively high SINR, among other examples) associated with pairings of UE transmit beams and UE receive beams. This may improve error rates of communications in full duplex operation, reduce consumption of computing resources to detect and correct errors, improve spectral efficiency (e.g., based at least in part on using a relatively high MCS), and/or reduce consumption of network resources that may otherwise have been used to communicate with a relatively low MCS.

Figure 4:
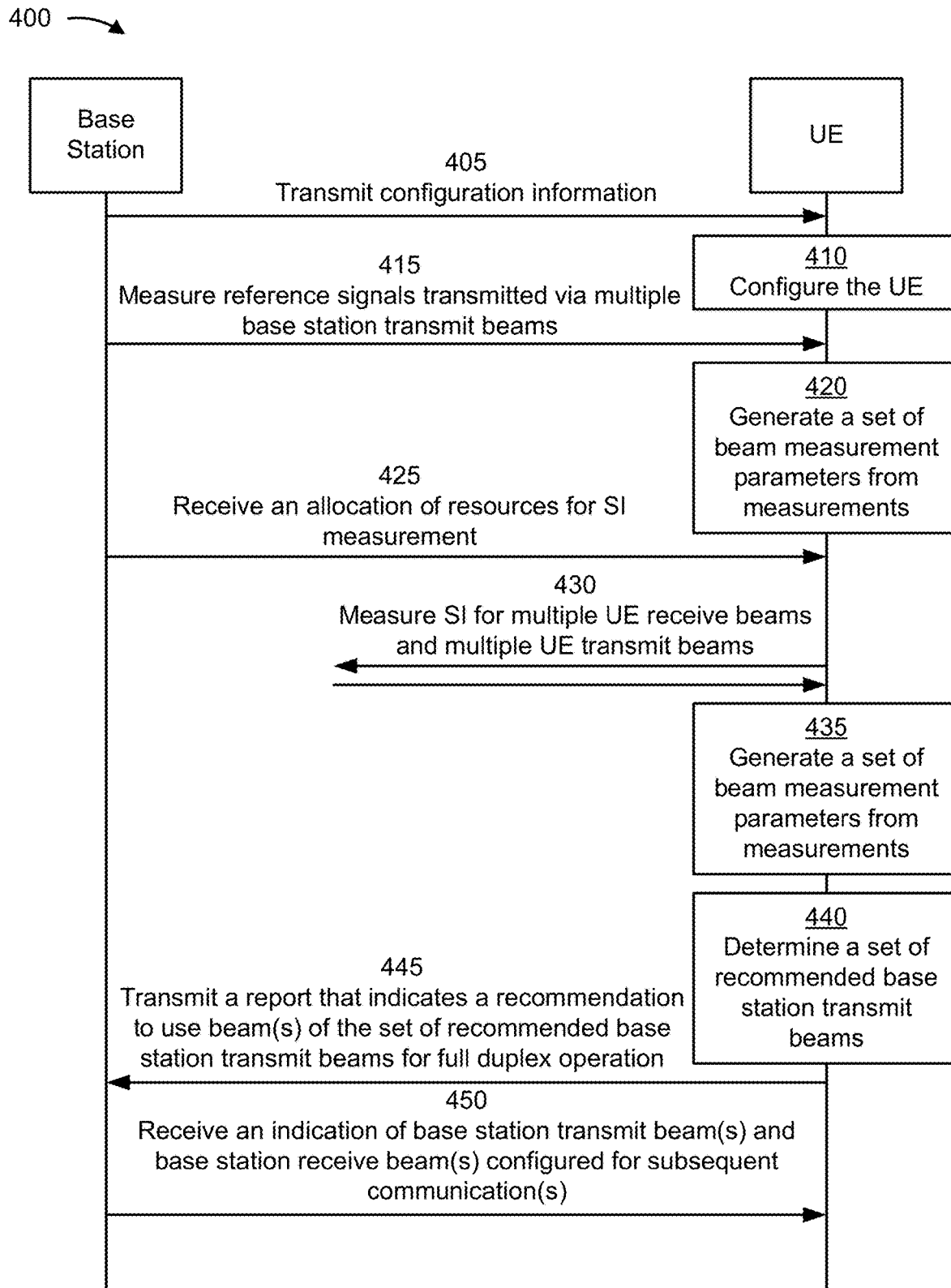
FIGS. 4-5C are diagrams illustrating examples associated with user equipment reporting for full duplex multi-beam selection, in accordance with various aspects of the present disclosure.

FIG. 4 is a diagram illustrating an example 400 associated with user equipment reporting for full duplex multi-beam selection, in accordance with various aspects of the present disclosure. As shown in FIG. 4, a UE (e.g., UE 120) may communicate with a base station (e.g., base station 110). The UE and the base station may be part of a wireless network (e.g., wireless network 100). In some aspects, the UE and the base station may perform one or more beam management procedures.

As shown by reference number 405, the base station may transmit, and the UE may receive, configuration information. In some aspects, the UE may receive configuration information from another device (e.g., from another base station, TRP associated with the base station, and/or another UE, among other examples) and/or a communication standard, among other examples. In some aspects, the UE may receive the configuration information via one or more of RRC signaling or MAC-CE signaling, and/or the UE may determine the configuration information from a communication standard, among other examples. In some aspects, the configuration information may include an indication of one or more configuration parameters (e.g., already known to the UE) for selection by the UE, explicit configuration information for the UE to use to configure the UE, and/or the like.

In some aspects, the configuration information may include beam management configuration information associated with a beam management operation. For example, the beam management configuration information may include instructions for the UE to perform beam management operations, an allocation of resources for performing beam management operations, and/or an indication that the beam management operations are associated with a full duplex operation, among other examples.

In some aspects, the configuration information may indicate that the UE is to measure reference signals transmitted via multiple base station transmit beams (e.g., as part of a beam management operation). For example, the configuration information may indicate that the UE is to measure reference signals using multiple UE receive beams simultaneously. In some aspects, the configuration information may indicate that the UE is to generate a set of beam measurement parameters, based at least in part on measuring the reference signals transmitted via the multiple base station transmit beams, associated with pairings of base station transmit beams and UE receive beams.

In some aspects, the configuration information may indicate that the UE is to receive an allocation of resources for self-interference measurement using a set of UE receive beams that are associated with the multiple base station transmit beams. In some aspects, the configuration information may indicate that the UE is to generate a set of beam measurement parameters associated with pairings of UE transmit beams and UE receive beams based at least in part on measuring self-interference for multiple UE receive beams and multiple UE transmit beams using the resources allocated by the base station.

In some aspects, the configuration information may indicate that the UE is to determine a set of recommended base station transmit beams for full duplex operation based at least in part on measurements of a set of base station transmit beams and measurements of self-interference (e.g., of UE transmit beams and UE receive beams) associated with the set of base station transmit beams. For example, the UE may determine that a first base station transmit beam is recommended for downlink communication and that a second base station transmit beam is recommended for uplink communication (e.g., using a reciprocal uplink beam).

As shown by reference number 410, the UE may configure the UE for communicating with the base station. In some aspects, the UE may configure the UE based at least in part on the configuration information. In some aspects, the UE may be configured to perform one or more operations described herein.

As shown by reference number 415, the base station may transmit, and the UE may measure, reference signals transmitted via multiple base station transmit beams. In some aspects, the base station may transmit the reference signals using a beam sweeping operation to transmit the reference signals using different base station beams with time division multiplexing. The reference signals may include one or more of CSI-RSs or SSBs. The measurement may include a measurement of RSRP for the reference signals as received by the multiple UE receive beams.

In some aspects, the UE may measure the reference signals using multiple UE receive beams simultaneously. For example, the UE may use multiple antenna groups to sense (e.g., attempt to receive) a single reference signal simultaneously. Additionally, or alternatively, the UE may use a sub-Terahertz (sub-THz) array of antenna elements to simultaneously operate multiple receive beams to sense the reference signal. For example, the UE may be configured to simultaneously sense the reference signal using multiple beams of a single antenna array (e.g., using a Butler matrix and/or other components of the UE).

As shown by reference number 420, the UE may generate a set of beam measurement parameters from measurements of the reference signals transmitted via the multiple base station beams. For example, the UE may generate a set of beam measurement parameters associated with pairings of base station transmit beams and UE receive beams based at least in part on measuring the reference signals transmitted via multiple base station transmit beams using multiple UE receive beams. The UE may store the set of beam measurement parameters in a matrix, a table, a list, a ranked list, and/or other formatted storage file.

As shown by reference number 425, the UE may receive, and the base station may transmit, an allocation of resources (e.g., time-frequency resources) for self-interference (SI) measurement. In some aspects, the allocation of resources for self-interference measurement may be associated with a new beam management procedure (e.g., in addition to P1 beam management, P2 beam management, and P3 beam management). The base station may transmit the allocation of resources via RRC signaling and/or MAC signaling, among other examples.

In some implementations, the base station may transmit the allocation of resources based at least in part on receiving an indication (e.g., from the UE) that the UE supports a full duplex operation. An amount of the resources may be based at least in part on a number of panels and/or receive beams associated with the UE.

As shown by reference number 430, the UE may measure self-interference for multiple UE receive beams and multiple UE transmit beams. For example, the UE may simultaneously transmit a reference signal via one or more UE transmit beams and sense the reference signal (e.g., attempt to receive the reference signal) via one or more UE receive beams.

The UE may measure an RSRP, SINR, and/or mutual interference information (e.g., a combination of self-interference and internal interference of the UE) associated with multiple UE receive beams associated with one or more UE transmit beams. In other words, the UE may determine an amount of interference caused by individual UE transmit beams as measured by one or more UE transmit beams. In this way, the UE may determine which receive beams will be negatively affected by interference if the UE is configured to use the one or more UE transmit beams to communicate with the base station. In some aspects, the UE may associate the measurements with UE transmit and UE receive beam pairing (e.g., beam coupling) options.

As shown by reference number 435, the UE may generate a set of beam measurement parameters from measurements of the self-interference. For example, the UE may generate a set of beam measurement parameters associated with pairings of UE transmit beams and UE receive beams based at least in part on measuring the reference signals, transmitted via one or more UE transmit beams, using multiple UE receive beams. The UE may store the set of beam measurement parameters in a matrix, a table, a list, a ranked list, and/or other formatted storage file.

As shown by reference number 440, the UE may determine a set of recommended base station transmit beams for subsequent communication. For example, the UE may determine a set of recommended base station transmit beams for full duplex operation based at least in part on measurements of a set of base station transmit beams and measurements of self-interference (e.g., as measured during self-interference measurements) associated with the set of base station transmit beams. In some aspects, the UE may determine the set of recommended base station transmit beams based at least in part on a set of beam measurement parameters associated with pairings of UE transmit beams and UE receive beams, and a set of beam measurement parameters associated with pairings of base station transmit beams and UE receive beams.

In some aspects, the UE may determine that the UE can receive signaling, transmitted by the base station with a first base station transmit beam, using a first beam of a first antenna group and can simultaneously transmit signaling, to be received by the base station using a first base station receive beam that is reciprocal with a second base station transmit beam, using a first beam of a second antenna group. In some aspects, the UE may determine multiple options of beam pairings based at least in part on the measurements of a set of base station transmit beams and measurements of self-interference.

In this way, the UE may determine an optimized pairing of beams for full duplex multi-beam (e.g., using non-reciprocal beams for uplink and downlink) based at least in part on self-interference in addition to parameters associated with receiving reference signals from the base station.

As shown by reference number 445, the UE may transmit, and the base station may receive, a report that indicates a recommendation to use one or more beams (e.g., base station transmit beams) of the set of recommended base station transmit beams for full duplex operation. In some aspects, the UE may transmit the report via a CSI report, a self-interference report, RRC signaling, MAC signal, and/or uplink control information.

In some aspects, the report may indicate an explicit indication of one or more beam pairs recommended for full duplex operation. In some aspects, the report may implicitly indicate the one or more beam pairs based at least in part on indicating one or more additional beams and/or additional beam pairs to not use for full duplex operation (e.g., based at least in part on self-interference). In some aspects, the report may indicate one or more TRPs to use for a beam pair.

As shown by reference number 450, the UE may receive, and the base station may transmit, an indication of one or more base station transmit beams and one or more base station receive beams configured for one or more subsequent communications. For example, the base station may transmit the indication via a resource grant, RRC signaling, and/or DCI.

Based at least in part on the UE determining recommended base station transmit beams based at least in part on measurements of self-interference beam relations and based at least in part on base station transmit beam to UE receive beam inter-beam interference, the UE may recommend beams for full duplex operation that have relatively good beam measurement associated with pairings of base station transmit beams and UE receive beams, and that have relatively good beam measurement parameters associated with pairings of UE transmit beams and UE receive beams. This may improve error rates of communications in full duplex operation, reduce consumption of computing resources to detect and correct errors, improve spectral efficiency, and/or reduce consumption of network resources that may otherwise have been used to communicate with a relatively low MCS.

As indicated above, FIG. 4 is provided as an example of beam management procedures. Other examples of beam management procedures may differ from what is described with respect to FIG. 4. For example, the UE may measure self-interference for multiple UE receive beams and multiple UE transmit beams before measuring reference signals transmitted via the multiple base station transmit beams.

Figure 5A:
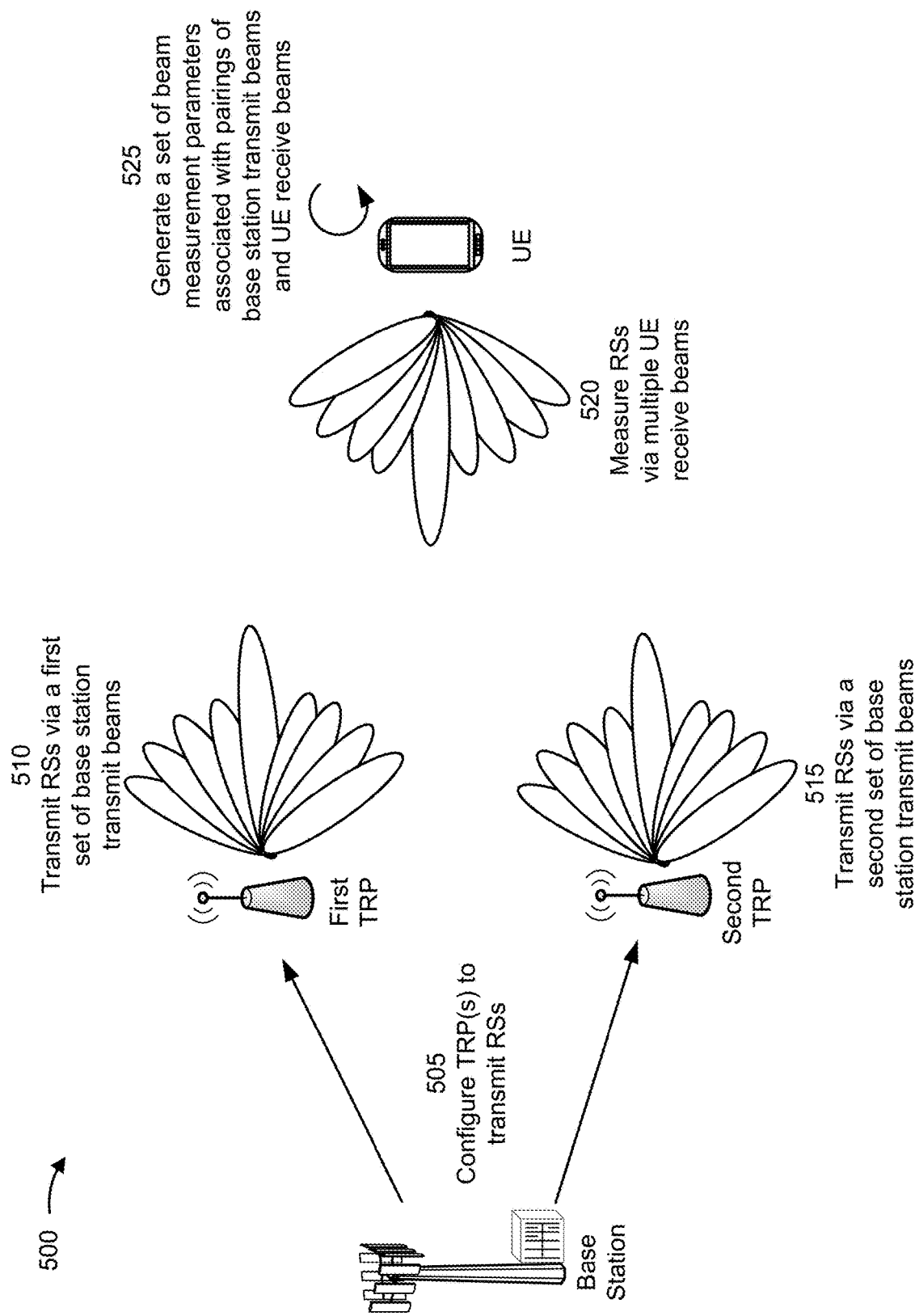
Figure 5B:
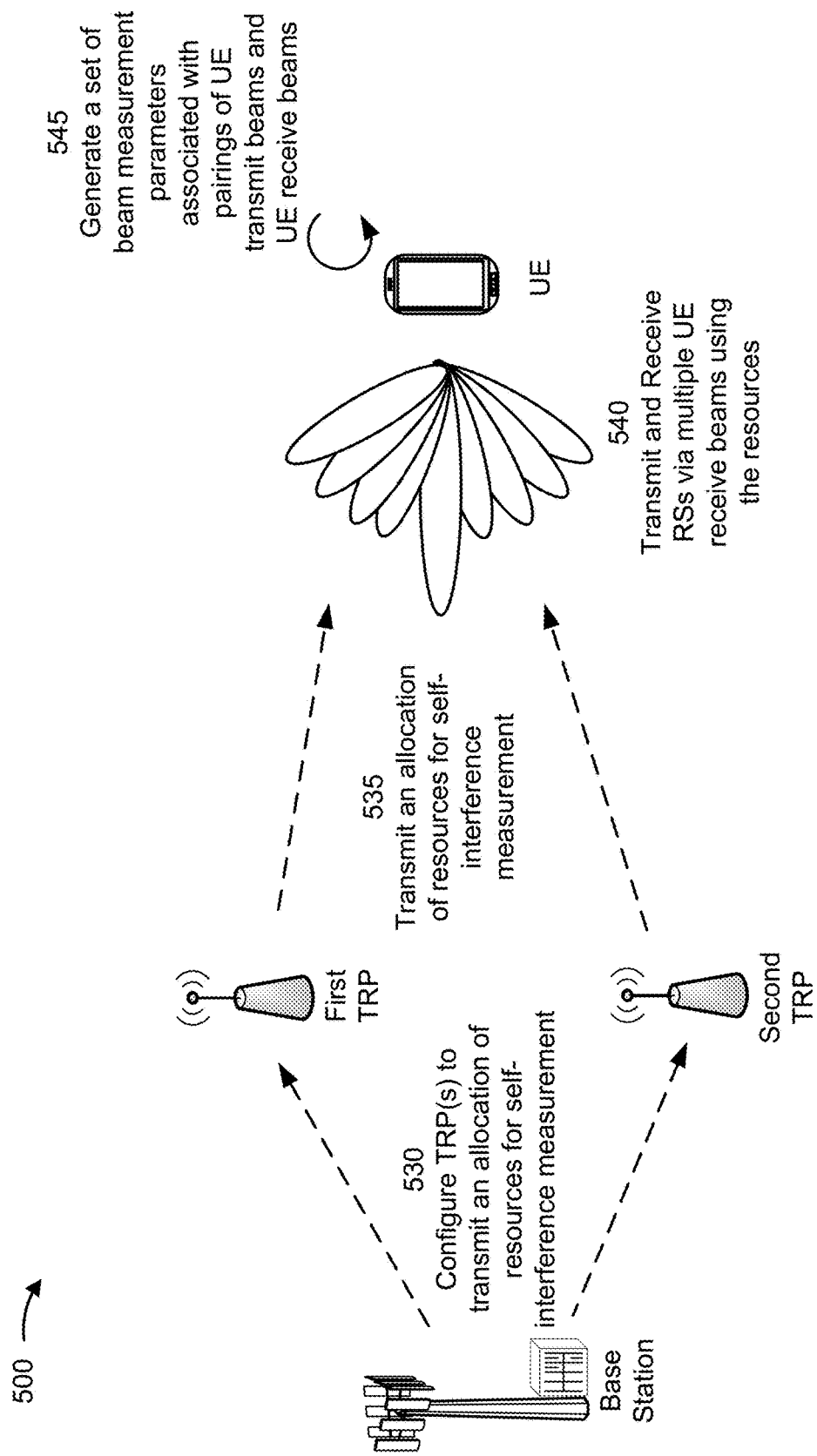
Figure 5C:
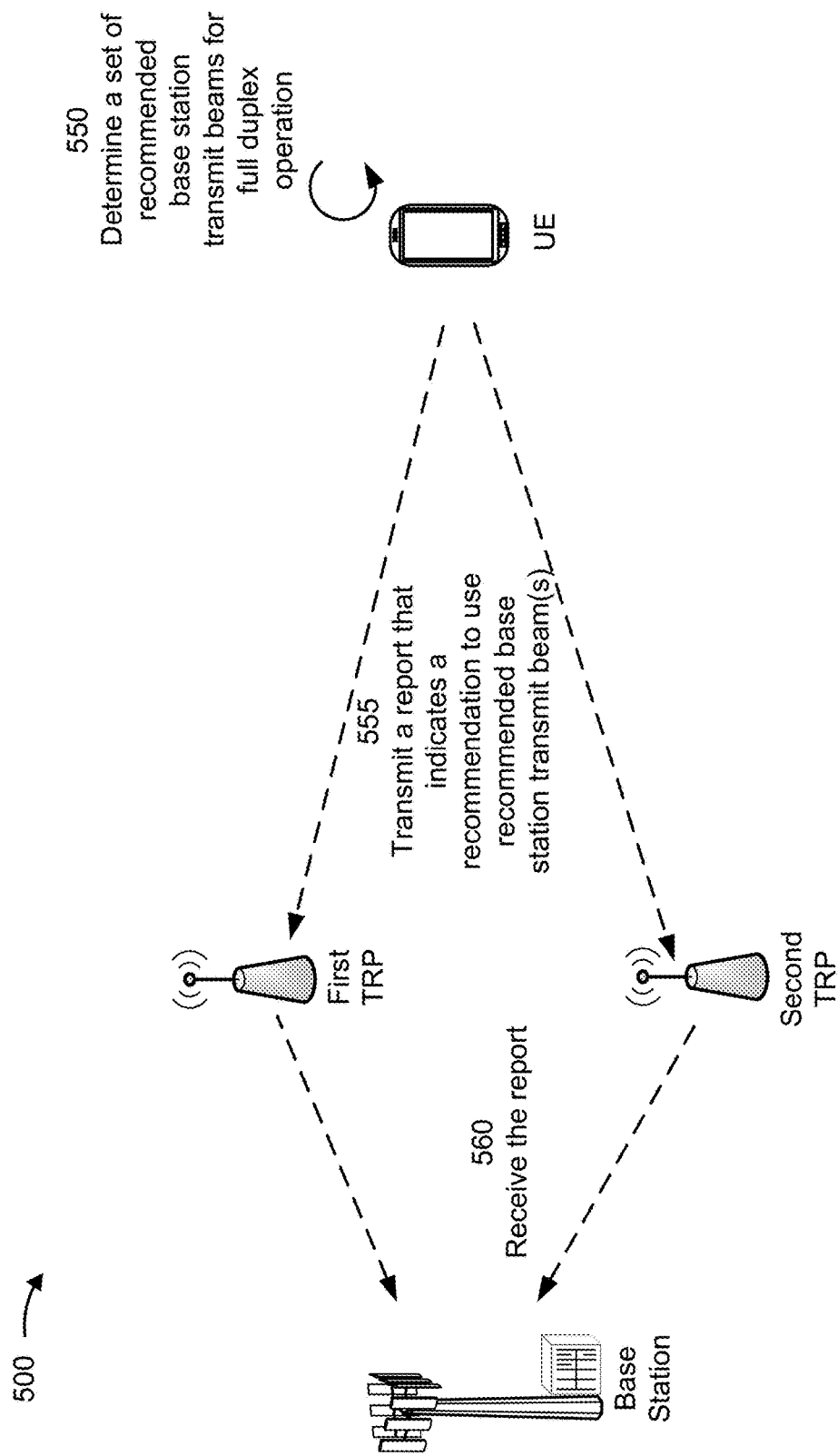

FIGS. 5A-5C are diagrams illustrating an example 500 associated with user equipment reporting for full duplex multi-beam selection, in accordance with various aspects of the present disclosure. As shown in FIG. 4, a UE (e.g., UE 120) may communicate with a base station (e.g., base station 110) via one or more TRPs (e.g., a first TRP and a second TRP). The UE, the base station, and the one or more TRPs may be part of a wireless network (e.g., wireless network 100). In some aspects, the UE and the base station may perform one or more beam management procedures via the one or more TRPs. In some aspects, the one or more TRPs may provide spatial diversity for beam-based communications between the base station and the UE.

As shown in FIG. 5A, and by reference number 505, the base station may configure the one or more TRPs to transmit reference signals (RSs). In some aspects, the UE may configure the one or more TRPs to transmit the reference signals as part of a beam management operation. For example, the base station may configure the one or more TRPs to transmit the reference signals to transmit the reference signals with time division multiplexing, individually, and/or collectively.

As shown by reference number 510, the first TRP may transmit the reference signals via a first set of base station transmit beams. As shown by reference number 515, the second TRP may transmit the reference signals via a second set of base station transmit beams. In some aspects, the first TRP and the second TRP may transmit the reference signals using time division multiplexing, for example, as part of a beam sweeping operation.

As shown by reference number 520, the UE may measure the reference signals via multiple UE receive beams. In some aspects, the UE may measure the reference signals via the multiple UE receive beams simultaneously. In some aspects, the UE may sequentially measure, using the multiple UE receive beams, repetitions of the reference signals transmitted by each of the sets of base station beams.

As shown by reference number reference number 525, the UE may generate a set of beam measurement parameters associated with pairings of base station transmit beams and UE receive beams. In some aspects, the UE may generate the set of beam measurement parameters based at least in part on storing measurements of the reference signals as measured by different UE receive beams.

As shown in FIG. 5B, and by reference number 530, the base station may configure at least one of the one or more TRPs to transmit an allocation of resources for self-interference measurement. In some aspects, the base station may determine one or more TRPs and/or base station transmit beams to use for transmitting the allocation of resources based at least in part on a report from the UE that indicates one or more base station transmit beams associated with relatively high measured RSRP.

As shown by reference number 535, the first TRP and/or the second TRP may transmit an allocation of resources (e.g., an indication of resources allocated) for self-interference measurement. In some aspects, the allocation of resources may be based at least in part on information received from the UE. For example, the information may be associated with an number of UE antenna groups, a number of UE receive beams associated with each UE antenna group, a total number of UE receive beams, and/or a number of antenna groups associated with shared baseband components, among other examples.

As shown by reference number 540, the UE may use the allocated resources to measure self-interference based at least in part on simultaneously transmitting reference signals (e.g., sounding reference signals, among other examples), using multiple UE transmit beams, and receiving (e.g., sensing) the reference signals, using multiple UE receive beams.

As shown by reference number 545, the UE may generate a set of beam measurement parameters associated with pairings of UE transmit beams and UE receive beams. In some aspects, the UE may generate the set of beam measurement parameters based at least in part on storing measurements of the reference signals as measured by different UE receive beams.

As shown in FIG. 5C, and by reference number 550, the UE may determine a set of recommended base station transmit beams for full duplex operation. For example, the UE may select multiple pairs of base station transmit beams in which a first base station transmit beam can be used for downlink communication and a first base station receive beam (e.g., associated with a second base station transmit beam) can be used for uplink communications. In some aspects, the determination may be based at least in part on the recommended base station transmit beams being associated with, for example an RSRP that satisfies a threshold for the base station transmit beam and one or more of an SINR, RSRP, and/or mutual interference information that satisfies a threshold for self-interference. In some aspects, the determination may be based at least in part on the recommended base station transmit beams being associated with a combine parameter, including an RSRP for the base station transmit beam and one or more of an SINR, RSRP, and/or mutual interference information, that satisfies a threshold for full duplex communication.

As shown by reference number 555, the UE may transmit, and the first TRP and/or the second TRP may receive, a report that indicates a recommendation to use one or more recommended base station transmit beams for full duplex operation. In some aspects, the report may include recommended pairings of base station transmit beams, recommended directions for each beam of a pair of base station transmit beams, pairings of base station transmit beams recommended to not be used, and/or TRPs recommended to use together for full duplex mode, among other examples.

As shown by reference number 560, the base station may receive the report via the first TRP and/or the second TRP. In some aspects, the base station may determine one or more base station transmit beams and/or one or more base station receive beams to use for full duplex operation with the UE. For example, the base station may select a pair of beams from the report.

As indicated above, FIG. 5 is provided as an example of beam management procedures. Other examples of beam management procedures may differ from what is described with respect to FIG. 5. For example, the UE may measure self-interference for multiple UE receive beams and multiple UE transmit beams before measuring reference signals transmitted via the multiple base station transmit beams.

Figure 6:
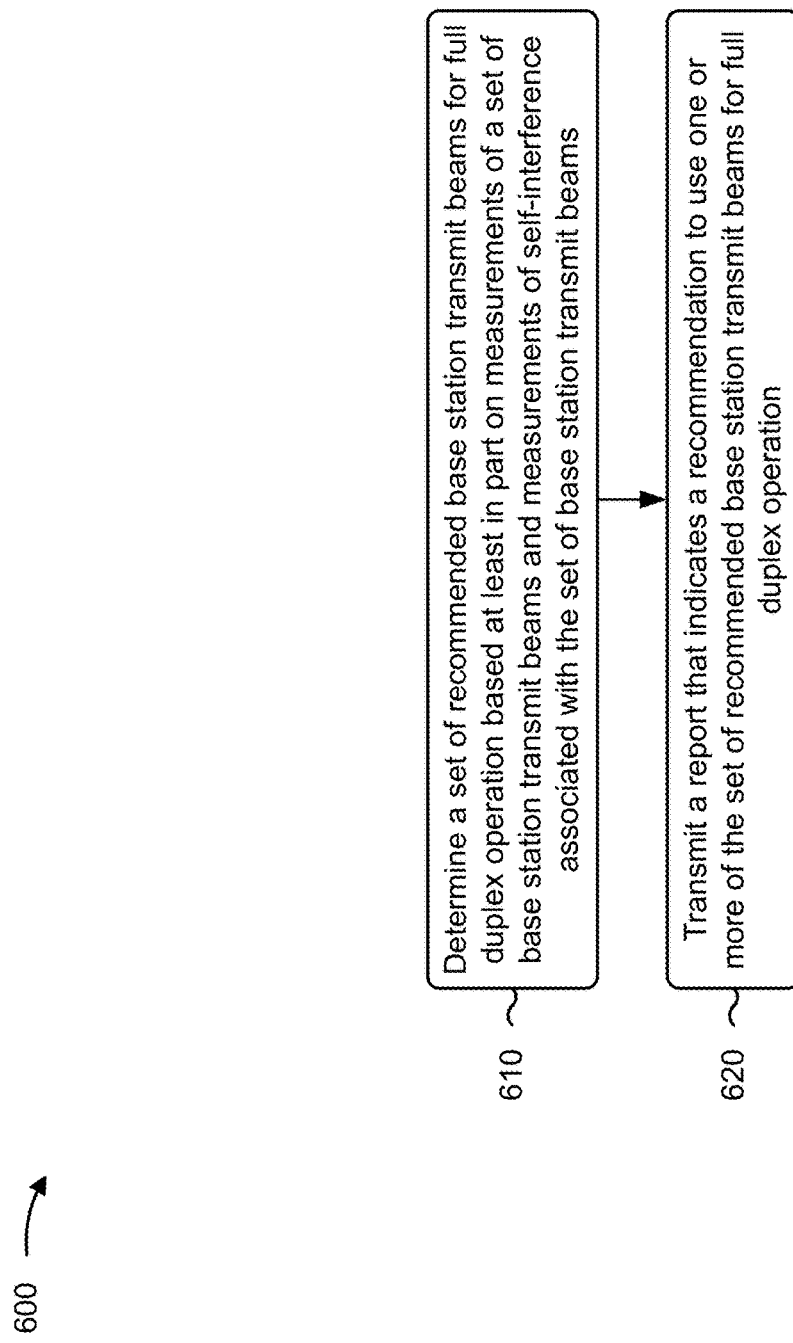
FIGS. 6 and 7 are diagrams illustrating example processes associated with user equipment reporting for full duplex multi-beam selection, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120) performs operations associated with user equipment reporting for full duplex multi-beam selection.

As shown in FIG. 6, in some aspects, process 600 may include determining a set of recommended base station transmit beams for full duplex operation based at least in part on measurements of a set of base station transmit beams and measurements of self-interference associated with the set of base station transmit beams (block 610). For example, the UE (e.g., using determination component 808, depicted in FIG. 8) may determine a set of recommended base station transmit beams for full duplex operation based at least in part on measurements of a set of base station transmit beams and measurements of self-interference associated with the set of base station transmit beams, as described above.

As further shown in FIG. 6, in some aspects, process 600 may include transmitting a report that indicates a recommendation to use one or more of the set of recommended base station transmit beams for full duplex operation (block 620). For example, the UE (e.g., using transmission component 804, depicted in FIG. 8) may transmit a report that indicates a recommendation to use one or more of the set of recommended base station transmit beams for full duplex operation, as described above.

Process 600 may include additional aspects, such as any single aspect or any combination of aspects described below and/or in connection with one or more other processes described elsewhere herein.

In a first aspect, process 600 includes receiving an allocation of resources for self-interference measurement and measuring self-interference for multiple UE receive beams and multiple UE transmit beams based at least in part on simultaneously transmitting and receiving reference signals using the resources.

In a second aspect, alone or in combination with the first aspect, receiving the allocation of resources for self-interference measurement comprises receiving the allocation of resources via one or more of radio resource control signaling or medium access control signaling.

In a third aspect, alone or in combination with one or more of the first and second aspects, process 600 includes generating, based at least in part on measuring self-interference for multiple UE receive beams and multiple UE transmit beams, a set of beam measurement parameters associated with pairings of UE transmit beams and UE receive beams.

In a fourth aspect, alone or in combination with one or more of the first through third aspects, process 600 includes measuring reference signals transmitted via multiple base station transmit beams, of the set of base station transmit beams, simultaneously using multiple UE receive beams.

In a fifth aspect, alone or in combination with one or more of the first through fourth aspects, process 600 includes generating, based at least in part on measuring the reference signals transmitted via multiple base station transmit beams using multiple UE receive beams, a set of beam measurement parameters associated with pairings of base station transmit beams and UE receive beams.

In a sixth aspect, alone or in combination with one or more of the first through fifth aspects, determining the set of recommended base station transmit beams comprises determining the set of recommended base station transmit beams, based at least in part on a set of beam measurement parameters associated with pairings of UE transmit beams and UE receive beams, and a set of beam measurement parameters associated with pairings of base station transmit beams and UE receive beams.

In a seventh aspect, alone or in combination with one or more of the first through sixth aspects, process 600 includes receiving an indication of one or more base station transmit beams and one or more base station receive beams configured for a subsequent communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
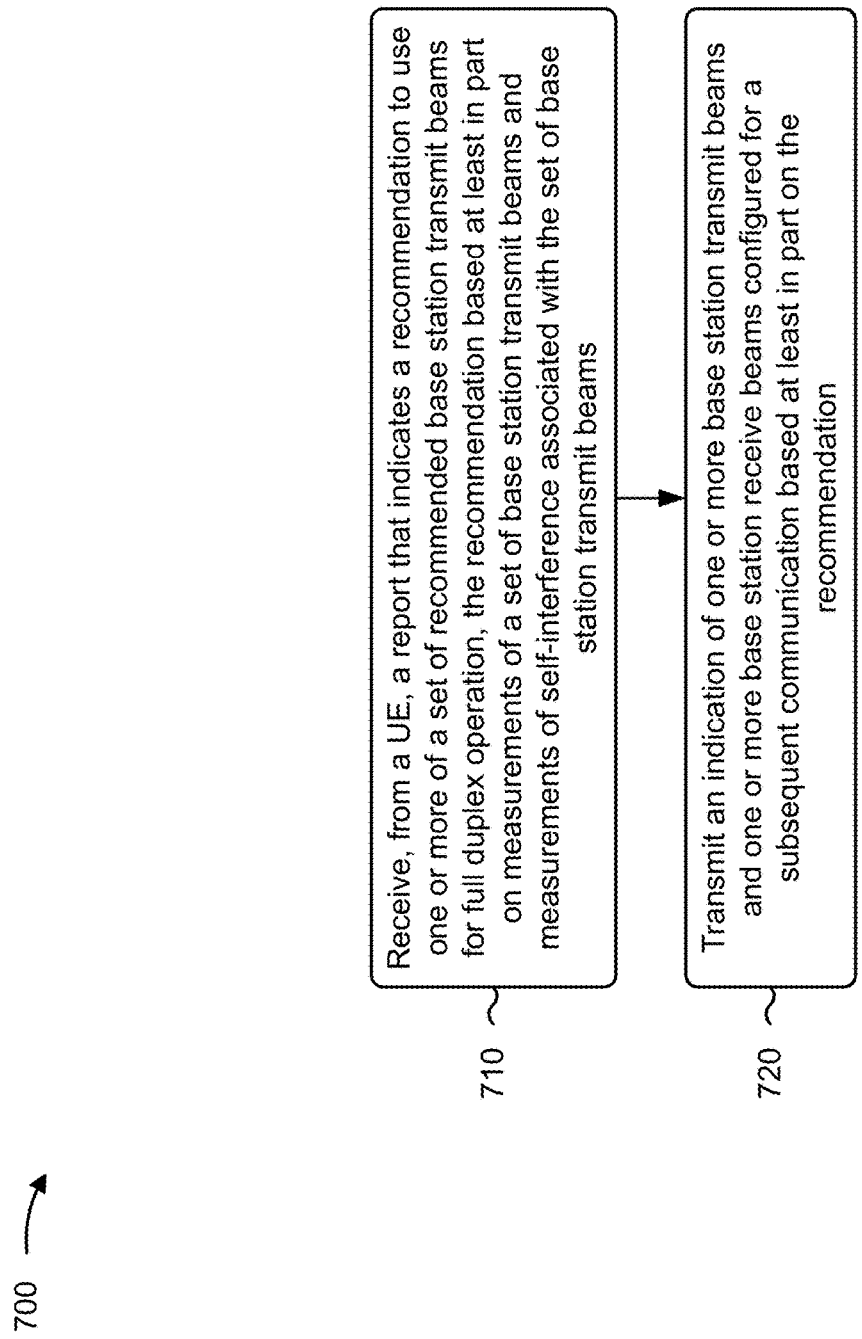

FIG. 7 is a diagram illustrating an example process 700 performed, for example, by a base station, in accordance with various aspects of the present disclosure. Example process 700 is an example where the base station (e.g., base station 110) performs operations associated with user equipment reporting for full duplex multi-beam selection.

As shown in FIG. 7, in some aspects, process 700 may include receiving, from a UE, a report that indicates a recommendation to use one or more of a set of recommended base station transmit beams for full duplex operation, the recommendation based at least in part on measurements of a set of base station transmit beams and measurements of self-interference associated with the set of base station transmit beams (block 710). For example, the base station (e.g., using reception component 902, depicted in FIG. 9) may receive, from a UE, a report that indicates a recommendation to use one or more of a set of recommended base station transmit beams for full duplex operation, the recommendation based at least in part on measurements of a set of base station transmit beams and measurements of self-interference associated with the set of base station transmit beams, as described above.

As further shown in FIG. 7, in some aspects, process 700 may include transmitting an indication of one or more base station transmit beams and one or more base station receive beams configured for a subsequent communication based at least in part on the recommendation (block 720). For example, the base station (e.g., using transmission component 904, depicted in FIG. 9) may transmit an indication of one or more base station transmit beams and one or more base station receive beams configured for a subsequent communication based at least in part on the recommendation, as described above.

Process 700 may include additional aspects, such as any single aspect or any combination of aspects described below and/or in connection with one or more other processes described elsewhere herein.

In a first aspect, process 700 includes transmitting an allocation of resources for self-interference measurement by a UE using a set of UE receive beams associated with the set of base station transmit beams.

In a second aspect, alone or in combination with the first aspect, process 700 includes transmitting configuration information that indicates that the UE is to generating, based at least in part on measuring self-interference for multiple UE receive beams and multiple UE transmit beams using the resources, a set of beam measurement parameters associated with pairings of UE transmit beams and UE receive beams.

In a third aspect, alone or in combination with one or more of the first and second aspects, transmitting the allocation of resources for self-interference measurement comprises transmitting the allocation of resources via one or more of radio resource control signaling or medium access control signaling.

In a fourth aspect, alone or in combination with one or more of the first through third aspects, process 700 includes transmitting reference signals via the set of base station transmit beams for measurement by the UE using multiple UE receive beams.

In a fifth aspect, alone or in combination with one or more of the first through fourth aspects, process 700 includes transmitting configuration information that indicates that the UE is to generating, based at least in part on measuring the reference signal transmitted using multiple UE receive beams, a set of beam measurement parameters associated with pairings of base station transmit beams and UE receive beams.

In a sixth aspect, alone or in combination with one or more of the first through fifth aspects, process 700 includes transmitting configuration information that indicates that the UE is to determining the set of recommended base station transmit beams based at least in part on a set of beam measurement parameters associated with pairings of UE transmit beams and UE receive beams, and a set of beam measurement parameters associated with pairings of base station transmit beams and UE receive beams.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
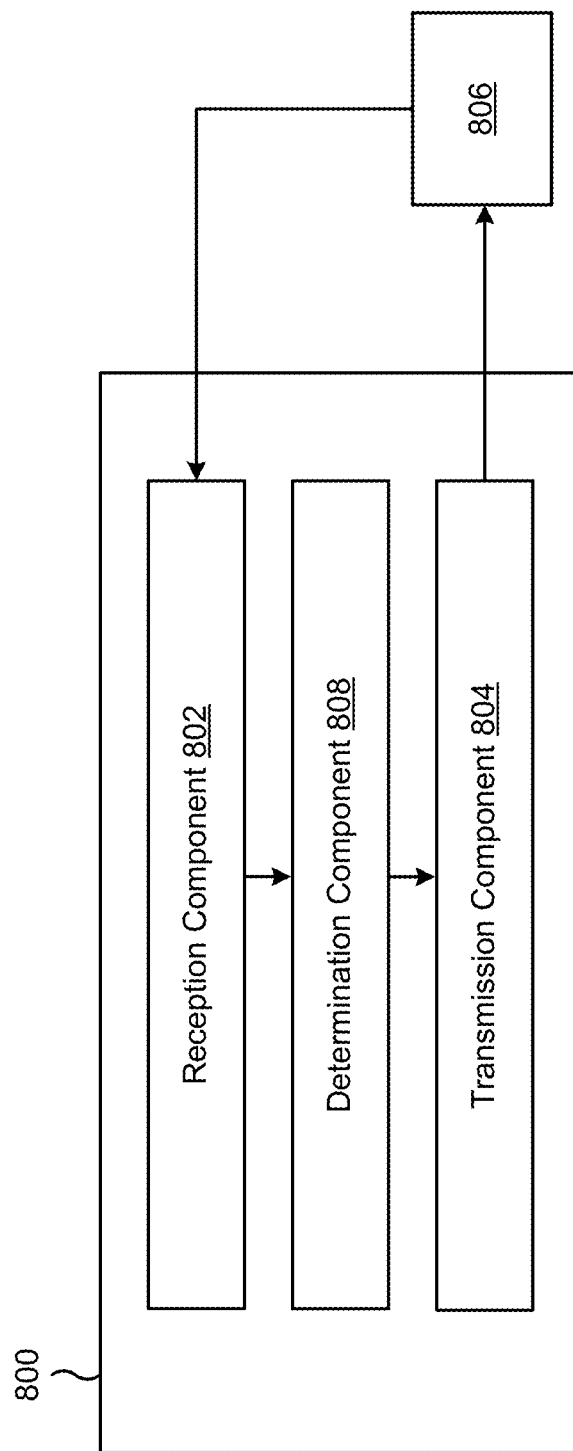
FIGS. 8 and 9 are block diagrams of example apparatuses for wireless communication, in accordance with various aspects of the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808.

In some aspects, the apparatus 800 may be configured to perform one or more operations described herein in connection with FIGS. 4-5C. Additionally, or alternatively, the apparatus 800 may be configured to perform one or more processes described herein, such as process 600. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The determination component 808 may determine a set of recommended base station transmit beams for full duplex operation based at least in part on measurements of a set of base station transmit beams and measurements of self-interference associated with the set of base station transmit beams. The transmission component 804 may transmit a report that indicates a recommendation to use one or more of the set of recommended base station transmit beams for full duplex operation.

The reception component 802 may receive an allocation of resources for self-interference measurement.

The reception component 802 and/or the determination component 808 may measure self-interference for multiple UE receive beams and multiple UE transmit beams based at least in part on simultaneously transmitting and receiving reference signals using the resources.

The determination component 808 may generate, based at least in part on measuring self-interference for multiple UE receive beams and multiple UE transmit beams, a set of beam measurement parameters associated with pairings of UE transmit beams and UE receive beams.

The reception component 802 and/or the determination component 808 may measure reference signals transmitted via multiple base station transmit beams, of the set of base station transmit beams, simultaneously using multiple UE receive beams.

The determination component 808 may generate, based at least in part on measuring the reference signals transmitted via multiple base station transmit beams using multiple UE receive beams, a set of beam measurement parameters associated with pairings of base station transmit beams and UE receive beams.

The reception component 802 may receive an indication of one or more base station transmit beams and one or more base station receive beams configured for a subsequent communication.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
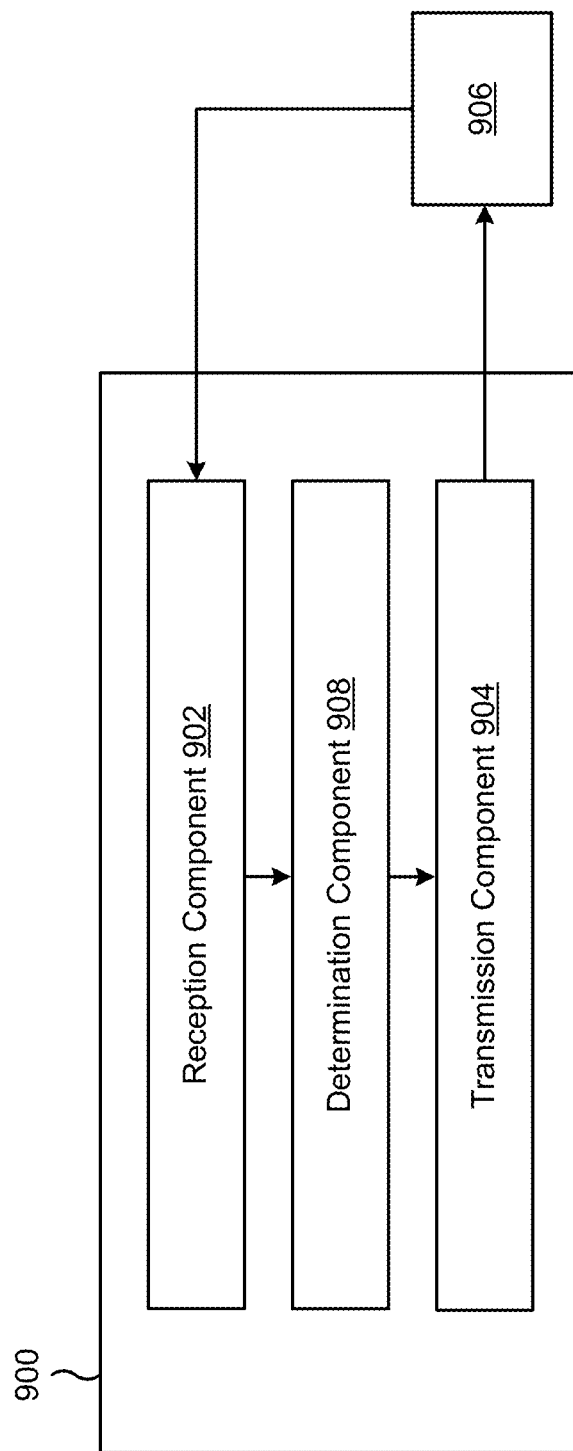

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908.

In some aspects, the apparatus 900 may be configured to perform one or more operations described herein in connection with FIGS. 4-5C. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The reception component 902 may receive, from a UE, a report that indicates a recommendation to use one or more of a set of recommended base station transmit beams for full duplex operation, the recommendation based at least in part on measurements of a set of base station transmit beams and measurements of self-interference associated with the set of base station transmit beams. The transmission component 904 may transmit an indication of one or more base station transmit beams and one or more base station receive beams configured for a subsequent communication based at least in part on the recommendation.

The transmission component 904 may transmit an allocation of resources for self-interference measurement by a UE using a set of UE receive beams associated with the set of base station transmit beams.

The transmission component 904 may transmit configuration information that indicates that the UE is generate, based at least in part on measuring self-interference for multiple UE receive beams and multiple UE transmit beams using the resources, a set of beam measurement parameters associated with pairings of UE transmit beams and UE receive beams.

The transmission component 904 may transmit reference signals via the set of base station transmit beams for measurement by the UE using multiple UE receive beams.

The transmission component 904 may transmit configuration information that indicates that the UE is generate, based at least in part on measuring the reference signal transmitted using multiple UE receive beams, a set of beam measurement parameters associated with pairings of base station transmit beams and UE receive beams.

The transmission component 904 may transmit configuration information that indicates that the UE is determine the set of recommended base station transmit beams based at least in part on: a set of beam measurement parameters associated with pairings of UE transmit beams and UE receive beams, and a set of beam measurement parameters associated with pairings of base station transmit beams and UE receive beams. The determination component 908 may determine the configuration information based at least in part on the report from the UE.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of aspects of the present disclosure:

Aspect 1: A method of wireless communication performed by a user equipment (UE), comprising: determining a set of recommended base station transmit beams for full duplex operation based at least in part on measurements of a set of base station transmit beams and measurements of self-interference associated with the set of base station transmit beams; and transmitting a report that indicates a recommendation to use one or more of the set of recommended base station transmit beams for full duplex operation.

Aspect 2: The method of aspect 1, further comprising: receiving an allocation of resources for self-interference measurement; and measuring self-interference for multiple UE receive beams and multiple UE transmit beams based at least in part on simultaneously transmitting and receiving reference signals using the resources.

Aspect 3: The method of aspect 2, wherein receiving the allocation of resources for self-interference measurement comprises: receiving the allocation of resources via one or more of radio resource control signaling or medium access control signaling.

Aspect 4: The method of any of aspects 1-3, further comprising: generating, based at least in part on measuring self-interference for multiple UE receive beams and multiple UE transmit beams, a set of beam measurement parameters associated with pairings of UE transmit beams and UE receive beams.

Aspect 5: The method of any of aspects 1-4, further comprising: measuring reference signals transmitted via multiple base station transmit beams, of the set of base station transmit beams, simultaneously using multiple UE receive beams.

Aspect 6: The method of any of aspects 1-5, further comprising: generating, based at least in part on measuring the reference signals transmitted via multiple base station transmit beams using multiple UE receive beams, a set of beam measurement parameters associated with pairings of base station transmit beams and UE receive beams.

Aspect 7: The method of any of aspects 1-6, wherein determining the set of recommended base station transmit beams comprises: determining the set of recommended base station transmit beams based at least in part on: a set of beam measurement parameters associated with pairings of UE transmit beams and UE receive beams, and a set of beam measurement parameters associated with pairings of base station transmit beams and UE receive beams.

Aspect 8: The method of any of aspects 1-3, further comprising: receiving an indication of one or more base station transmit beams and one or more base station receive beams configured for a subsequent communication.

Aspect 9: A method of wireless communication performed by a base station, comprising: receiving, from a user equipment (UE), a report that indicates a recommendation to use one or more of a set of recommended base station transmit beams for full duplex operation, the recommendation based at least in part on measurements of a set of base station transmit beams and measurements of self-interference associated with the set of base station transmit beams; and transmitting an indication of one or more base station transmit beams and one or more base station receive beams configured for a subsequent communication based at least in part on the recommendation.

Aspect 10: The method of aspect 9, further comprising: transmitting an allocation of resources for self-interference measurement by a UE using a set of UE receive beams associated with the set of base station transmit beams.

Aspect 11: The method of aspect 10, further comprising transmitting configuration information that indicates that the UE is to: generate, based at least in part on measuring self-interference for multiple UE receive beams and multiple UE transmit beams using the resources, a set of beam measurement parameters associated with pairings of UE transmit beams and UE receive beams.

Aspect 12: The method of any of aspects 9-11, wherein transmitting the allocation of resources for self-interference measurement comprises: transmitting the allocation of resources via one or more of radio resource control signaling or medium access control signaling.

Aspect 13: The method of any of aspects 9-12, further comprising: transmitting reference signals via the set of base station transmit beams for measurement by the UE using multiple UE receive beams.

Aspect 14: The method of aspect 13, further comprising transmitting configuration information that indicates that the UE is to: generate, based at least in part on measuring the reference signal transmitted using multiple UE receive beams, a set of beam measurement parameters associated with pairings of base station transmit beams and UE receive beams.

Aspect 15: The method of any of aspects 9-14, further comprising transmitting configuration information that indicates that the UE is to: determine the set of recommended base station transmit beams based at least in part on: a set of beam measurement parameters associated with pairings of UE transmit beams and UE receive beams, and a set of beam measurement parameters associated with pairings of base station transmit beams and UE receive beams.

Aspect 16: An apparatus for wireless communication at a device, comprising a processor; memory coupled with the processor; and instructions stored in the memory and executable by the processor to cause the apparatus to perform the method of one or more aspects of aspects 1-15.

Aspect 17: A device for wireless communication, comprising a memory and one or more processors coupled to the memory, the memory and the one or more processors configured to perform the method of one or more aspects of aspects 1-15.

Aspect 18: An apparatus for wireless communication, comprising at least one means for performing the method of one or more aspects of aspects 1-15.

Aspect 19: A non-transitory computer-readable medium storing code for wireless communication, the code comprising instructions executable by a processor to perform the method of one or more aspects of aspects 1-15.

Aspect 20: A non-transitory computer-readable medium storing a set of instructions for wireless communication, the set of instructions comprising one or more instructions that, when executed by one or more processors of a device, cause the device to perform the method of one or more aspects of aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The invention claimed is:

1. A method of wireless communication performed by a user equipment (UE), comprising:
    transmitting a report indicating a set of recommended base station transmit beams for full duplex operation, the set of recommended base station transmit beams being determined in accordance with measurements of a set of base station transmit beams and measurements of self-interference associated with the set of base station transmit beams; and
    receiving an indication of one or more base station transmit beams for the full duplex operation.

2. The method of claim 1, wherein transmitting the report comprises:
    transmitting a channel state information (CSI) report, the CSI report indicating the set of recommended base station transmit beams for the full duplex operation.

3. The method of claim 1, wherein transmitting the report comprises:
    transmitting a self-interference report, the self-interference report indicating the set of recommended base station transmit beams for the full duplex operation.

4. The method of claim 1, wherein transmitting the report comprises:
    transmitting the report indicating the set of recommended base station transmit beams for the full duplex operation via radio resource control (RRC) signaling.

5. The method of claim 1, wherein transmitting the report comprises:
    transmitting uplink control information (UCI), the UCI indicating the set of recommended base station transmit beams for the full duplex operation.

6. The method of claim 1, wherein the report includes an explicit indication of the set of recommended base station transmit beams for the full duplex operation.

7. The method of claim 1, wherein the report includes an implicit indication of the set of recommended base station transmit beams for the full duplex operation.

8. The method of claim 7, wherein the implicit indication includes an indication of one or more base station transmit beams that are not to be used for the full duplex operation.

9. The method of claim 1, further comprising:
receiving an allocation of resources for self-interference measurement, the measurements of the self-interference associated with the set of base station transmit beams being determined using the allocation of resources for self-interference measurement.

10. The method of claim 1, wherein the measurements for self-interference include one or more of a reference signal received power (RSRP), a signal-to-interference-plus-noise ratio (SINR), or mutual interference information associated with multiple UE receive beams associated with one or more UE transmit beams.

11. A non-transitory computer-readable medium storing a set of instructions for wireless communication, the set of instructions comprising:
one or more instructions that, when executed by one or more processors of a user equipment (UE), cause the UE to:
transmit a report indicating a set of recommended base station transmit beams for full duplex operation, the set of recommended base station transmit beams being determined in accordance with a set of base station transmit beams and measurements of self-interference associated with the set of base station transmit beams; and
receive an indication of one or more base station transmit beams for the full duplex operation.

12. The non-transitory computer-readable medium of claim 11, wherein the one or more instructions, that cause the UE to transmit the report, cause the UE to:
transmit a channel state information (CSI) report or a self-interference report indicating the set of recommended base station transmit beams for the full duplex operation.

13. The non-transitory computer-readable medium of claim 11, wherein the one or more instructions, that cause the UE to transmit the report, cause the UE to:
transmit the report indicating the set of recommended base station transmit beams for the full duplex operation via radio resource control (RRC) signaling.

14. The non-transitory computer-readable medium of claim 11, wherein the one or more instructions, that cause the UE to transmit the report, cause the UE to:
transmit uplink control information (UCI), the UCI indicating the set of recommended base station transmit beams for the full duplex operation.

15. The non-transitory computer-readable medium of claim 11, wherein the report includes an explicit indication of the set of recommended base station transmit beams for the full duplex operation.

16. The non-transitory computer-readable medium of claim 11, wherein the report includes an implicit indication of the set of recommended base station transmit beams for the full duplex operation.

17. The non-transitory computer-readable medium of claim 16, wherein the implicit indication includes an indication of one or more base station transmit beams that are not to be used for the full duplex operation.

18. The non-transitory computer-readable medium of claim 11, wherein the one or more instructions further cause the UE to:
receive an allocation of resources for self-interference measurement, the measurements of the self-interference associated with the set of base station transmit beams being determined using the allocation of resources for self-interference measurement.

19. The non-transitory computer-readable medium of claim 11, wherein the measurements for self-interference include one or more of a reference signal received power (RSRP), a signal-to-interference-plus-noise ratio (SINR), or mutual interference information associated with multiple UE receive beams associated with one or more UE transmit beams.

20. A user equipment (UE) for wireless communication, comprising:
one or more memories; and
one or more processors, coupled to the one or more memories, configured to:
transmit a report indicating a set of recommended base station transmit beams for full duplex operation, the set of recommended base station transmit beams being determined in accordance with measurements of a set of base station transmit beams and measurements of self-interference associated with the set of base station transmit beams; and
receive an indication of one or more base station transmit beams for the full duplex operation.

21. The UE of claim 20, wherein the one or more processors, to transmit the report, are configured to:
transmit a channel state information (CSI) report, the CSI report indicating the set of recommended base station transmit beams for the full duplex operation.

22. The UE of claim 20, wherein the one or more processors, to transmit the report, are configured to:
transmit a self-interference report, the self-interference report indicating the set of recommended base station transmit beams for the full duplex operation.

23. The UE of claim 20, wherein the one or more processors, to transmit the report, are configured to:
transmit the report indicating the set of recommended base station transmit beams for the full duplex operation via radio resource control (RRC) signaling.

24. The UE of claim 20, wherein the one or more processors, to transmit the report, are configured to:
transmit uplink control information (UCI), the UCI indicating the set of recommended base station transmit beams for the full duplex operation.

25. The UE of claim 20, wherein the report includes an explicit indication of the set of recommended base station transmit beams for the full duplex operation.

26. The UE of claim 20, wherein the report includes an implicit indication of the set of recommended base station transmit beams for the full duplex operation.

27. The UE of claim 26, wherein the implicit indication includes an indication of one or more base station transmit beams that are not to be used for the full duplex operation.

28. The UE of claim 20, wherein the one or more processors are further configured to:
receive an allocation of resources for self-interference measurement, the measurements of the self-interference associated with the set of base station transmit beams being determined using the allocation of resources for self-interference measurement.

29. The UE of claim 20, wherein the measurements for self-interference include one or more of a reference signal received power (RSRP), a signal-to-interference-plus-noise ratio (SINR), or mutual interference information associated with multiple UE receive beams associated with one or more UE transmit beams.

30. An apparatus for wireless communication, comprising:
    means for transmitting a report indicating a set of recommended base station transmit beams for full duplex operation, the set of recommended base station transmit beams being determined in accordance with measurements of a set of base station transmit beams and measurements of self-interference associated with the set of base station transmit beams; and
    means for receiving an indication of one or more base station transmit beams for the full duplex operation.

* * * * *